United States Patent
Takasu et al.

(10) Patent No.: US 10,742,845 B2
(45) Date of Patent: Aug. 11, 2020

(54) IMAGE PROCESSING APPARATUS IDENTIFYING PIXEL WHICH SATISFIES SPECIFIC CONDITION AND PERFORMING REPLACEMENT PROCESS ON PIXEL VALUE OF IDENTIFIED PIXEL

(71) Applicant: Brother Kogyo Kabushiki Kaisha, Nagoya-shi, Aichi-ken (JP)

(72) Inventors: Masaya Takasu, Nagoya (JP); Ryuji Yamada, Ogaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/564,232

(22) Filed: Sep. 9, 2019

(65) Prior Publication Data

US 2020/0106925 A1    Apr. 2, 2020

(30) Foreign Application Priority Data

Sep. 28, 2018 (JP) ................................ 2018-183704

(51) Int. Cl.
*H04N 1/58* (2006.01)
*G06T 7/90* (2017.01)
(Continued)

(52) U.S. Cl.
CPC .............. *H04N 1/58* (2013.01); *G06T 5/003* (2013.01); *G06T 5/30* (2013.01); *G06T 7/90* (2017.01);
(Continued)

(58) Field of Classification Search
CPC ...... H04N 1/407; H04N 1/4072; H04N 1/409; H04N 1/4092; H04N 1/58; H04N 1/60; H04N 1/6027; H04N 1/6072; G06K 15/1872; G06K 15/1873; G06K 15/1874; G06K 15/1878; G06K 15/188; G06T 7/10;
(Continued)

(56) References Cited

U.S. PATENT DOCUMENTS 5,617,485 A * 4/1997 Ohuchi .............. G06K 9/00456
                                                        358/462
7,088,472 B1   8/2006 Okubo et al.
(Continued)

FOREIGN PATENT DOCUMENTS

JP    H04-281671 A    10/1992
JP    2000-295471 A   10/2000

*Primary Examiner* — Scott A Rogers
(74) *Attorney, Agent, or Firm* — Banner & Witcoff, Ltd.

(57) ABSTRACT

In an image forming apparatus, a processor acquires target image data representing a target image. The processor identifies as a first type pixel in the target image, and sets a target pixel from among peripheral pixels of the pixel identified as the first type pixel. The processor identifies the target pixel as a second type pixel in a case where the target pixel satisfies a specific condition. The processor generates processed image data by performing a replacement process in which a pixel value of the pixel identified as the first type pixel is replaced with a first value representing a first color and a pixel value of the pixel identified as the second type pixel is replaced with a second value representing a second color. The specific condition includes a condition that all specific pixels in a specific range match a specific pattern.

12 Claims, 11 Drawing Sheets

(51) Int. Cl.
*H04N 1/60* (2006.01)
*G06T 5/30* (2006.01)
*G06T 5/00* (2006.01)
*H04N 1/52* (2006.01)

(52) U.S. Cl.
CPC ............ *H04N 1/52* (2013.01); *H04N 1/6058* (2013.01); *H04N 1/6072* (2013.01); *G06T 2207/10008* (2013.01); *G06T 2207/10024* (2013.01); *G06T 2207/20036* (2013.01); *G06T 2207/20192* (2013.01); *G06T 2207/30176* (2013.01); *H04N 2201/0094* (2013.01)

(58) Field of Classification Search
CPC .. G06T 7/12; G06T 7/13; G06T 7/181; G06T 7/194; G06T 7/90
See application file for complete search history.

(56) References Cited

U.S. PATENT DOCUMENTS

| | | | |
|---|---|---|---|
| 2003/0048958 A1* | 3/2003 | Ishiguro | G06T 5/20 382/261 |
| 2012/0162719 A1* | 6/2012 | Klaus | H04N 1/4051 358/3.13 |
| 2015/0146064 A1* | 5/2015 | Nakamura | G06T 3/403 348/302 |
| 2018/0096234 A1* | 4/2018 | Yamada | G06K 15/1881 |
| 2019/0087679 A1* | 3/2019 | Yamada | H04N 1/40062 |
| 2019/0208083 A1* | 7/2019 | Nagai | H04N 1/00005 |

* cited by examiner

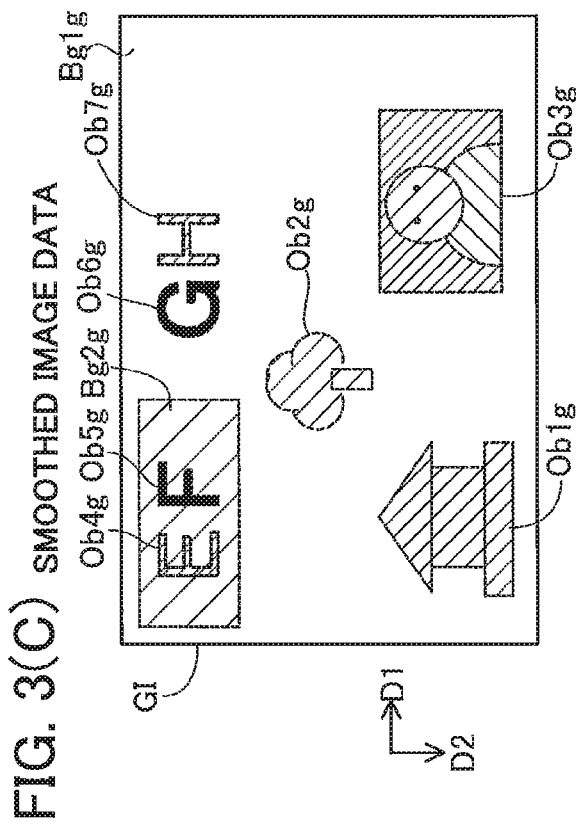
FIG. 3(A) SCAN DATA
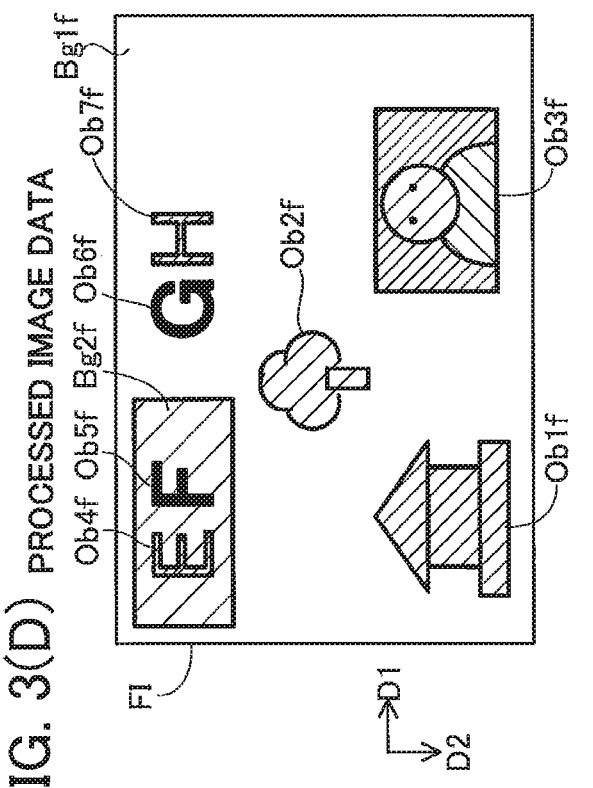
FIG. 3(C) SMOOTHED IMAGE DATA
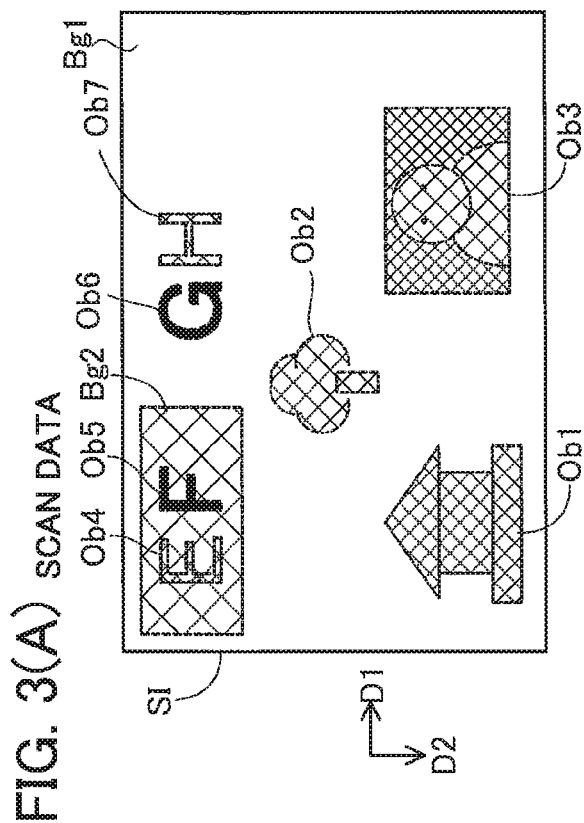
FIG. 3(B) BINARY IMAGE DATA
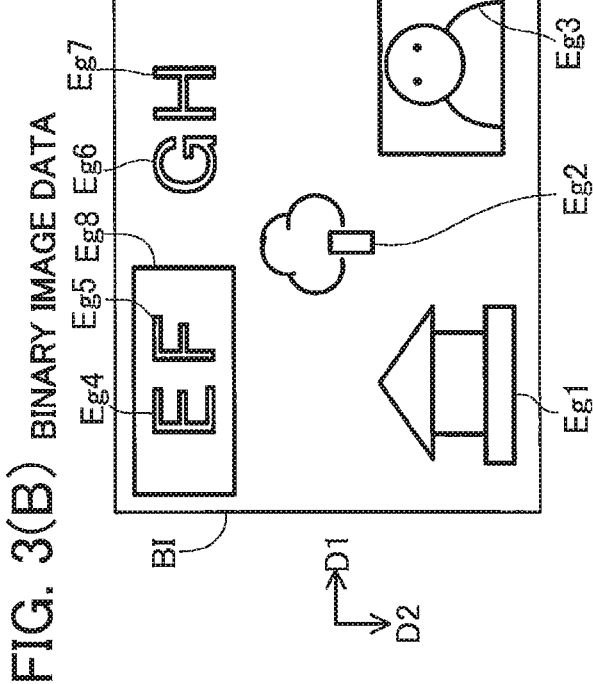
FIG. 3(D) PROCESSED IMAGE DATA

CHARACTER COLOR REPLACEMENT PATTERNS

+ : CURRENT PIXEL

FIG. 10
PART OF BACKGROUND COLOR REPLACEMENT PATTERNS
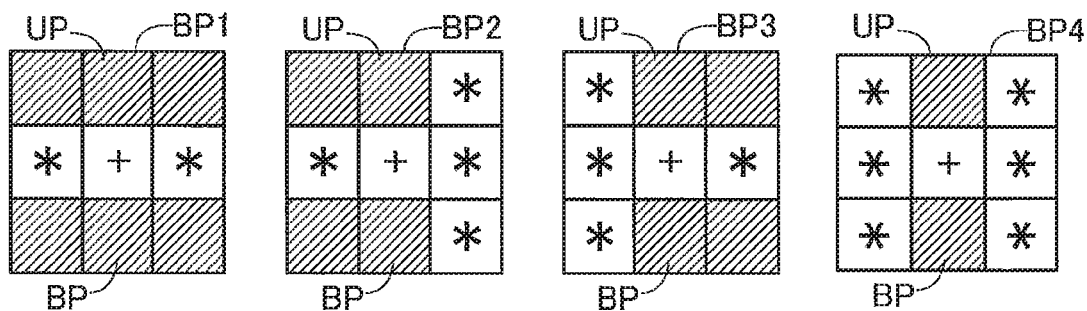
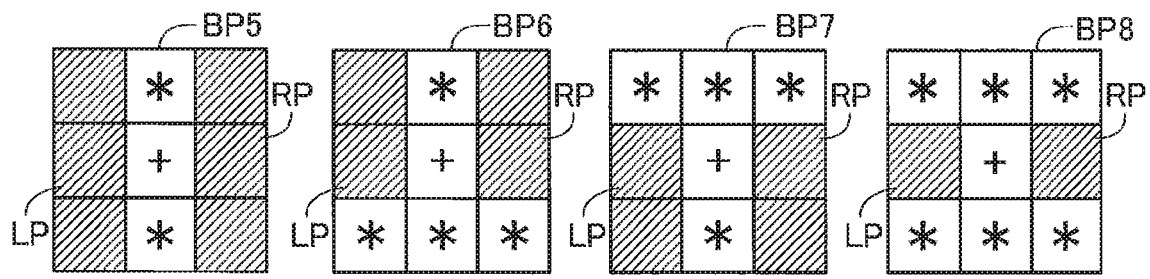
+ : CURRENT PIXEL
* : ANY PIXEL

IMAGE PROCESSING APPARATUS IDENTIFYING PIXEL WHICH SATISFIES SPECIFIC CONDITION AND PERFORMING REPLACEMENT PROCESS ON PIXEL VALUE OF IDENTIFIED PIXEL

CROSS REFERENCE TO RELATED APPLICATION

This application claims priority from Japanese Patent Application No. 2018-183704 filed Sep. 28, 2018. The entire content of the priority application is incorporated herein by reference.

TECHNICAL FIELD

The present disclosure relates to an image process for an image represented by image data.

BACKGROUND

A conventional image processing apparatus detects whether a target pixel constitutes a black edge and detects whether the target pixel constitutes a white edge. A black edge is detected when the target pixel is a black pixel and the density at the border with peripheral pixels changes from white to black. A white edge is detected when the target pixel is a white pixel and the density at the border with peripheral pixels changes from black to white. The image processing apparatus changes the multiple value representing the target pixel to their maximum level (level representing pure black) when the target pixel constitutes a black edge, and changes the multiple value representing the target pixel to their minimum level (level representing pure white) when the target pixel constitutes a white edge. This image process is thought to be capable of achieving suitable edge enhancement.

SUMMARY

However, the conventional technique described above may not always enhance edges properly. For example, when target image data is generated with an image sensor (scan data, for example), the values of pixels may change gradually at the edges. Consequently, it can be difficult to detect whether the target pixel constitutes a white edge or to detect whether the target pixel constitutes a black edge. In such cases, the edges may not be properly enhanced. This problem is not limited to edge enhancement for black edges and white edges, but is a problem that also occurs when sharpening borders between a first color and a second color.

In view of the foregoing, it is an object of the present disclosure to provide a new technique for generating processed image data representing a processed image having well-defined borders between a first color and a second color in the target image.

In order to attain the above and other objects, the disclosure provides an image processing apparatus. The image forming apparatus includes a processor configured to perform: acquiring target image data generated by using an image sensor, the target image data representing a target image including a plurality of pixels, the target image data having a plurality of pixel values corresponding to respective ones of the plurality of pixels; identifying as a first type pixel a pixel among the plurality of pixels by using the plurality of pixel values, the first type pixel being one of candidates for a pixel to have a first color; setting a target pixel from among peripheral pixels of the pixel which is identified as the first type pixel in the target image; determining whether the target pixel satisfies a specific condition; identifying the target pixel as a second type pixel in a case where the target pixel satisfies the specific condition, the second type pixel being a candidate for a pixel to have a second color different from the first color; and generating processed image data by performing a replacement process in which a pixel value of the pixel identified as the first type pixel is replaced with a first value representing the first color and a pixel value of the pixel identified as the second type pixel is replaced with a second value representing the second color. The specific condition includes a condition that all specific pixels, which are located in a specific range and include the target pixel, match a specific pattern of the first type pixel and a pixel different from the first type pixel.

According to another aspect, the disclosure provides a non-transitory computer readable storage medium storing a set of program instructions for an image processing apparatus. The set of program instructions includes: acquiring target image data generated by using an image sensor, the target image data representing a target image including a plurality of pixels, the target image data having a plurality of pixel values corresponding to respective ones of the plurality of pixels; identifying as a first type pixel a pixel among the plurality of pixels by using the plurality of pixel values, the first type pixel being one of candidates for a pixel to have a first color; setting a target pixel from among peripheral pixels of the pixel which is identified as the first type pixel in the target image; determining whether the target pixel satisfies a specific condition; identifying the target pixel as a second type pixel in a case where the target pixel satisfies the specific condition, the second type pixel being a candidate for a pixel to have a second color different from the first color; and generating processed image data by performing a replacement process in which a pixel value of the pixel identified as the first type pixel is replaced with a first value representing the first color and a pixel value of the pixel identified as the second type pixel is replaced with a second value representing the second color. The specific condition includes a condition that all specific pixels, which are located in a specific range and include the target pixel, match a specific pattern of the first type pixel and a pixel different from the first type pixel.

According to still another aspect, the disclosure provides a method. The method includes: acquiring target image data generated by using an image sensor, the target image data representing a target image including a plurality of pixels, the target image data having a plurality of pixel values corresponding to respective ones of the plurality of pixels; identifying as a first type pixel a pixel among the plurality of pixels by using the plurality of pixel values, the first type pixel being one of candidates for a pixel to have a first color; setting a target pixel from among peripheral pixels of the pixel which is identified as the first type pixel in the target image; determining whether the target pixel satisfies a specific condition; identifying the target pixel as a second type pixel in a case where the target pixel satisfies the specific condition, the second type pixel being a candidate for a pixel to have a second color different from the first color; and generating processed image data by performing a replacement process in which a pixel value of the pixel identified as the first type pixel is replaced with a first value representing the first color and a pixel value of the pixel identified as the second type pixel is replaced with a second value representing the second color. The specific condition includes a condition that all specific pixels, which are located in a specific range and include the target pixel, match a specific pattern of the first type pixel and a pixel different from the first type pixel.

BRIEF DESCRIPTION OF THE DRAWINGS

The particular features and advantages of the disclosure as well as other objects will become apparent from the following description taken in connection with the accompanying drawings, in which:

FIG. 3(A) is an example of a scan image used in the image process;

FIG. 3(B) is an example of a binary image generated in the image process;

FIG. 3(C) is an example of a smoothed image generated in the image process;

FIG. 3(D) is an example of a processed image generated in the image process;

FIG. 10 is an explanatory diagram illustrating background color replacement patterns.

DETAILED DESCRIPTION

A. Embodiment

A-1: Configuration of Multifunction Peripheral 200

Figure 1:
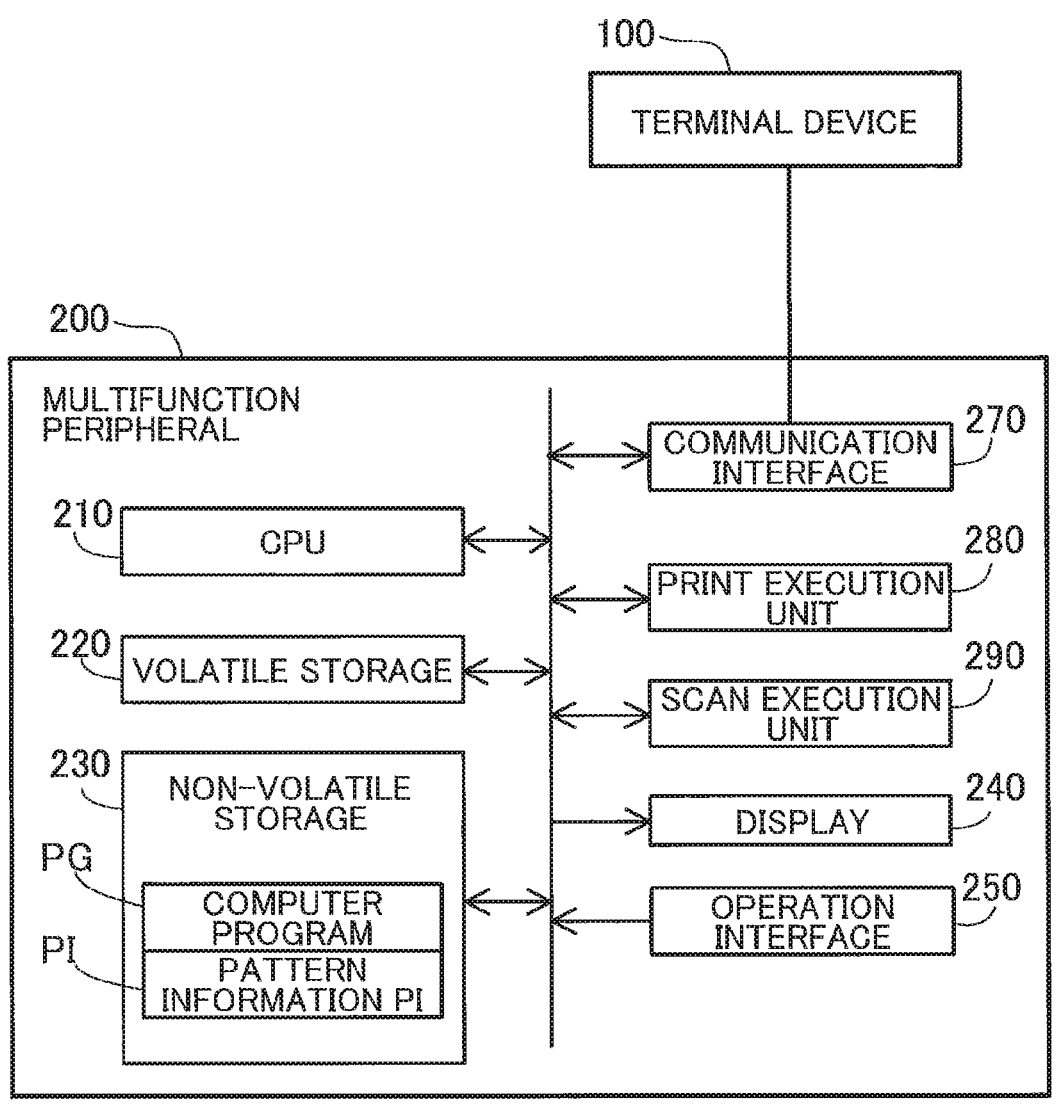
FIG. 1 is a block diagram illustrating a multifunction peripheral as an example of an image processing apparatus.

An image processing apparatus according to an embodiment will be described while referring to the accompanying drawings. FIG. 1 is a block diagram illustrating the configuration of a multifunction peripheral 200 as an example of the image processing apparatus. The multifunction peripheral 200 includes a central processing unit (CPU) 210 which is a processor for controlling the multifunction peripheral 200, a volatile storage 220 such as a dynamic random access memory (DRAM), a non-volatile storage 230 such as a flash memory, a hard disk drive, or the like, a display 240 including a liquid crystal display and the like, an operation interface 250 including a touch panel and buttons superimposed on the liquid crystal display, a communication interface 270 for communicating with an external device such as a user terminal device 100, a print execution unit 280, and a scan execution unit 290.

The scan execution unit 290 optically reads an original using an one-dimensional image sensor according to control of the CPU 210 to generate scan data. The print execution unit 280 prints an image onto a print medium such as a paper sheet with a laser according to control of the CPU 210 by using a plurality of types of toner, specifically toner in the colors cyan (C), magenta (M), yellow (Y), and black (K), as coloring materials. More specifically, the print execution unit 280 exposes a photosensitive drum (not shown) to form an electrostatic latent image and makes the toner adhere to the electrostatic latent image to thereby form a toner image. The print execution unit 280 transfers the toner image formed on the photosensitive drum (not shown) onto the paper sheet. The print execution unit 280 may employ an inkjet method which forms an image onto a paper sheet by ejecting ink as coloring materials.

The volatile storage 220 provides a buffer area for temporarily storing various intermediate data generated when the CPU 210 performs processing. The non-volatile storage 230 stores a computer program PG and pattern information PI therein. The computer program PG is a control program allowing the CPU 210 to perform control of the multifunction peripheral 200. In the present embodiment, the computer program PG and the pattern information PI are previously stored in the non-volatile storage 230 at the time of manufacturing the multifunction peripheral 200. Alternatively, the computer program PG and the pattern information PI may be provided by being downloaded from a server or by being stored in a DVD-ROM and the like. The CPU 210 executes the computer program PG to thereby execute an image process to be described later. The pattern information PI indicates character color replacement patterns TP1-TP20 (FIG. 9) used in a pattern matching S440 of FIG. 8 (described later).

A-2: Image Process

Figure 2:
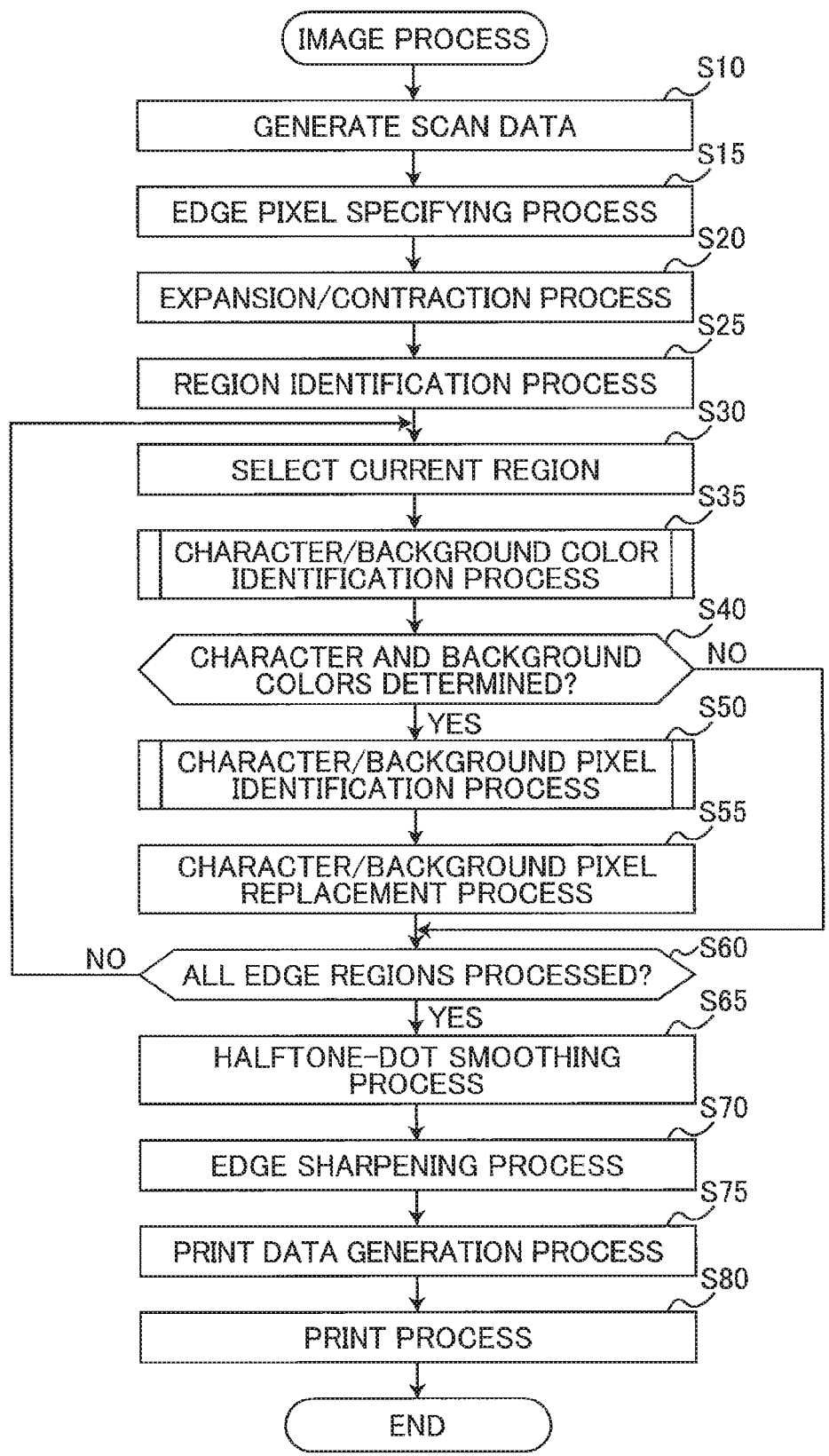
FIG. 2 is a flowchart illustrating an image process.

FIG. 2 is a flowchart illustrating steps in the image process. The image process is executed when a user places an original on a platen of the scan execution unit 290 and inputs a copy execution instruction through the operation interface 250, for example. The image process acquires scan data generated by the scan execution unit 290 reading the original and, from the scan data, generates print data representing the original to thereby copy the original.

In S10, the CPU 210 controls the scan execution unit 290 to read the original placed on the platen by the user to generate scan data as target image data. The original is a printed matter on which an image is printed by the multifunction peripheral 200 or an unillustrated printer, for example. The generated scan data is stored in the buffer area of the volatile storage 220 (FIG. 1). Thus, the CPU 210 acquires the scan data of the original as the target image data. The scan data is RGB image data including a plurality of pixels. The color of each pixel in the scan data is represented by a color value (or an RGB value) in color coordinate system. The RGB value of one pixel includes three component values of red (R), green (G), and blue (B) (hereinafter, referred to also as "R value", "G value", and "B value"), for example. In the present embodiment, the number of gradations of each component value is 256. The number of gradations of each color value is not limited to 256, and may be the number greater than or equal to 3, such as 64 or 128.

FIGS. 3(A)-3(D) are illustrating examples of images used in the image process. FIG. 3(A) illustrates an example of a scan image SI represented by the scan data. The scan image SI is made up of a plurality of pixels arranged in a matrix form in which the pixels are arranged in rows (first direction D1) and columns (second direction D2). The second direction D2 is orthogonal to the first direction D1.

The scan image SI of FIG. 3(A) includes a white background Bg1 representing the base color of the original document, three objects Ob1 to Ob3 different from characters (letters), four characters Ob4 to Ob7, and a background Bg2 of the two characters (letters) Ob4 and Ob5. Each object different from characters (letters) are a photo or a drawing for example. The characters Ob5 and Ob6 are black characters (letters). The characters Ob4 and Ob7 are characters (letters) having a color different from black, such as blue or red. The background Bg2 is a uniform image having a color different from white.

In S15, the CPU 210 performs an edge pixel specifying process on the scan data. The edge pixel specifying process is a process specifying a plurality of edge pixels constituting an edge in the scan image SI from among all the pixels constituting the scan image SI. As a result of the above edge pixel specifying process, binary image data is generated. Here, in the binary image data, the values of the edge pixel and non-edge pixel are set to "1" and "0" for example, respectively.

Specifically, the CPU 210 uses the scan data to generate luminance image data representing the luminance of each of the plurality of pixels in the scan image SI. Luminance Y can be calculated using the RGB value (R, G, and B) according to the following expression for example: $Y=0.299 \times R + 0.587 \times G + 0.114 \times B$. The CPU 210 applies a so-called Sobel filter to the value of each pixel in the luminance image data to calculate edge strength Se. The CPU 210 generates edge strength data in which the value of each pixel is represented by an edge strength Se.

The following shows a calculation expression (1) of the edge strength. A gradation value P (x, y) in the expression (1) indicates the gradation value (luminance) of a specific pixel position (x, y) in a luminance image. The position x indicates a pixel position in the first direction D1, and the position y indicates a pixel position in the second direction D2. An edge strength Se (x, y) at the pixel position (x, y) in the luminance image are calculated using the values of nine pixels arrayed in a 3×3 matrix including a pixel at the pixel position (x, y) as the center and eight pixels surrounding the pixel position (x, y). Each of the first and second terms in the calculation expression (1) is an absolute value of the sum of the values obtained by multiplying the gradation values of the pixels at the nine positions by their corresponding coefficients. The first term is a differential of the gradation value in the first direction D1 (i.e., a differential regarding the horizontal direction), and the second term is a differential of the gradation value in the second direction D2 (i.e., a differential regarding the vertical direction). The calculated edge strength Se (x, y) is normalized to 256 gradation values from 0 to 255.

$$Se(x, y) = \left\| \begin{bmatrix} -1 & 0 & 1 \\ -2 & 0 & 2 \\ -1 & 0 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\| + \left\| \begin{bmatrix} -1 & -2 & -1 \\ 0 & 0 & 0 \\ 1 & 2 & 1 \end{bmatrix} \begin{bmatrix} P(x-1, y-1) & P(x, y-1) & P(x+1, y-1) \\ P(x-1, y) & P(x, y) & P(x+1, y) \\ P(x-1, y+1) & P(x, y+1) & P(x+1, y+1) \end{bmatrix} \right\|$$

Expression (1)

The CPU 210 performs a binarization process on the edge strength data to generate binary image data. For example, the CPU 210 classifies a pixel having a value (i.e., edge strength) equal to or larger than a threshold value (e.g., 128) in the edge image data into an edge pixel and classifies a pixel in the binary image data having a value smaller than the threshold value into a non-edge pixel in the binary image data. Here, the binary image data represents a binary image having a plurality of pixels respectively corresponding to respective ones of the plurality of pixels in the scan image SI. The edge pixel of the binary image indicates that a corresponding pixel in the scan image SI is an edge pixel representing a part of edge. The non-edge pixel of the binary image indicates that a corresponding pixel in the scan images a non-edge pixel representing a part of non-edge image. That is, when a pixel is the edge pixel in the binary image, a corresponding pixel in the scan data is an edge pixel. When a pixel is the non-edge pixel in the binary image, a corresponding pixel in the scan data is the non-edge pixel. Accordingly, the plurality of edge pixels in the scan image SI are specified.

FIG. 3(B) illustrates an example of a binary image BI represented by the binary image data. In the binary image BI, a plurality of edge pixels constituting edges Eg1 to Eg7 of the objects Ob1 to Ob7 in the scan image SI and a plurality of edge pixels constituting an edge Eg8 as the boundary between the backgrounds Bg1 and Bg2 are specified. Thus, the edges mainly include the edges of characters. The edges further include edges such as thin lines included in the objects (e.g., a drawing or a photo) different from characters.

In S20, the CPU 210 performs an expansion/contraction process on the generated binary image data to generate expansion/contraction-processed binary image data. The expansion/contraction process includes an expansion process expanding edges constituted by the plurality of specified edge pixels and a contraction process contracting the expansion-processed edges. Each of the expansion process and the contraction process is repeatedly executed prescribed number of times (e.g., two times).

Figure 4A:
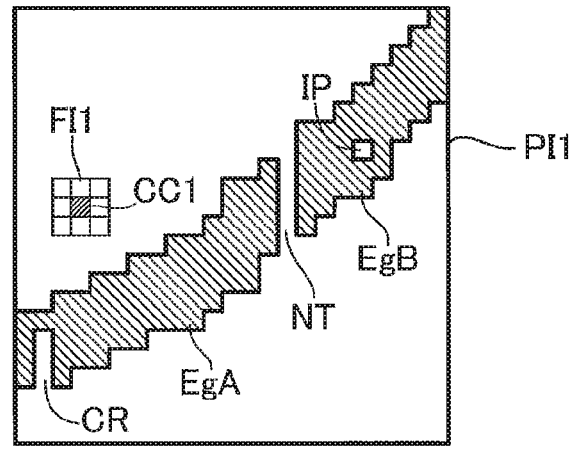
FIGS. 4(A)-4(C) are explanatory diagrams illustrating an expansion/contraction process.
Figure 4B:
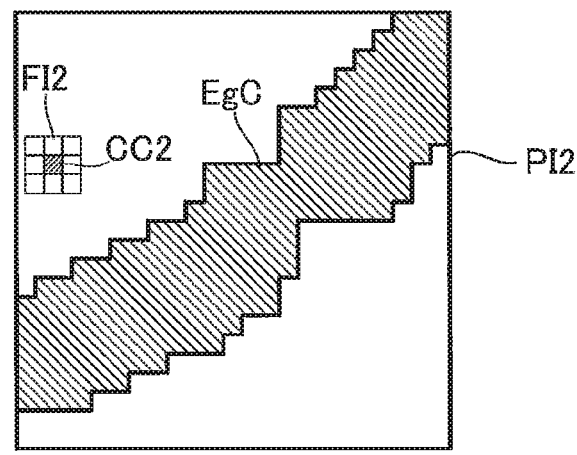
Figure 4C:
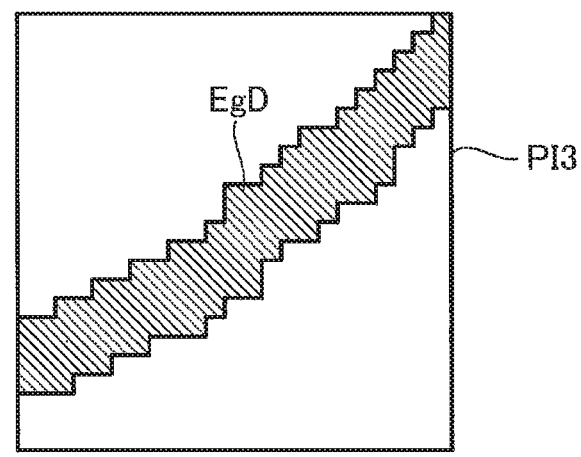

FIGS. 4(A)-4(C) are views explaining the expansion process and the contraction process. FIG. 4(A) illustrates a partial image PI1 of the binary image BI (FIG. 3(B)). The partial image PI1 includes edges EgA and EgB before the expansion process is performed. The two edges EgA and EgB are separated from each other by a gap NT. The edge EgA includes a crack CR, and the edge EgB includes an isolated non-edge pixel IP. Generally, in a case where a character has a certain degree of thickness, the character may include a region including a non-edge pixel therein, such as the edge pixel IP. When an edge corresponding to one continuous line or character includes the gap NT, the crack CR, and the non-edge pixel IP, they are preferably removed for a region identification process of S25, which will be described later. That is, the expansion process and the contraction process are executed for removing the gap NT, the crack CR, and the non-edge pixel IP.

The expansion process is applied to the binary image data representing the binary image BI using a filter having a prescribed size (in the example of FIG. 4(A), a filter FI1 having a size of 3×3 pixels (horizontally arranged pixels x vertically arranged pixels)). Specifically, the CPU 210 applies the filter FI1 to the binary image data to generate expansion-processed binary image data. That is, the CPU 210 locates the filter FI1 on the binary image BI including the partial image PI1 so that a center position CC1 (see FIG. 4(A)) of the filter FI1 overlaps a target pixel. When there is any edge pixel in the range of the filter FI1, the CPU 210 defines a pixel of the expansion-processed binary image (not illustrated) corresponding to the target pixel so that the defined pixel is set as an edge pixel. When there is no edge pixel in the range of the filter FI1, that is, when all the nine pixels in the range of the filter FI1 are the non-edge pixels, the CPU 210 defines a pixel of the expansion-processed binary image (not illustrated) corresponding to the target pixel so that the defined pixel is set as a non-edge pixel. The CPU 210 sequentially selects all the pixels in the binary image BI as the target pixel and sets the corresponding pixel in the expansion-processed binary image to one of the edge and non-edge pixels, thereby generating the expansion-processed binary image data representing the expansion-processed binary image.

FIG. 4(B) illustrates an expansion-processed partial image PI2 of the expansion-processed binary image corresponding to the partial image PI1 of FIG. 4(A). As shown in FIG. 4(B), the abovementioned gap NT, the crack CR, and the isolated non-edge pixel IP are removed in the expansion-processed partial image PI2. Further, in the expansion-processed partial image PI2, one edge EgC corresponding to the edges EgA and EgB of the partial image PI1 of FIG. 4(A) is thicker than (expanded as compared to) the edges EgA and EgB.

The contraction process is applied to the expansion-processed binary image data using a filter having a prescribed size (in the example of FIG. 4(B), a filter FI2 having a size of 3×3 pixels (length×width)). Specifically, the CPU 210 applies the filter FI2 to the binary image data representing the expansion-processed binary image to generate contraction-processed binary image data. That is, the CPU 210 locates the filter FI2 on the expansion-processed binary image BI so that a center position CC2 (see FIG. 4(B)) of the filter FI2 overlaps a target pixel. When there is a non-edge pixel in the range of the filter FI2, the CPU 210 defines a pixel of the contraction-processed binary image (not illustrated) corresponding to the target pixel so that the defined pixel is set as a non-edge pixel. When there is no non-edge pixel in the range of the filter FI2, that is, when all the nine pixels in the range of the filter FI2 are the edge pixels, the CPU 210 defines a pixel of the contraction-processed binary image (not illustrated) corresponding to the target pixel so that the defined pixel is set as an edge pixel. The CPU 210 sequentially selects all the pixels in the expansion-processed binary image BI as the target pixel and sets the corresponding pixel in the contraction-processed binary image to one of the non-edge and edge pixels, thereby generating the contraction-processed binary image data representing the contraction-processed binary image.

FIG. 4(C) illustrates a contraction-processed partial image PI3 of the contraction-processed binary image corresponding to the partial image PI1 of FIG. 4(A). The gap NT, the crack CR, and the isolated non-edge pixel IP do not appear in the partial image PI3. One edge EgD corresponding to the edges EgA and EgB of the partial image PI1 of FIG. 4(A) is contracted to a thickness almost the same as those of the edges EgA and EgB. When such expansion process and the contraction process are repeated a plurality of times, almost all the pixels constituting a comparatively small character, e.g., a character of 12 points or less are specified as the edge pixel. For example, though in the binary image BI shown in FIG. 3(B), pixels of inner regions of the characters Ob4-Ob7 are not specified as the edge pixels, all the pixels of the entire region of each of the character Ob4-Ob7 are specified as the edge pixels in the binary image data after the expansion/contraction-process is executed.

The sizes of the respective filters FI1 and FI2, that is, the degree of expansion by the expansion process and the degree of contraction by the contraction process are merely examples. For example, the filters FI1 and FI2 may each be a filter having a size of 5×5 pixels or 7×7 pixels (horizontally arranged pixels × vertically arranged pixels). It is preferable that, in the finally generated expansion/contraction-processed binary image data, the edges therein are expanded as compared to those in the binary image data before the expansion/contraction process so that a plurality of pixels constituting a blurred portion in the edge of a character or the like are specified as the edge pixel without omission.

The expansion/contraction-processed binary image data is hereinafter referred to merely as "binary image data", and the edge pixel specified in the expansion/contraction-processed binary image data is referred to merely as "edge pixel".

In S25 of FIG. 2, the CPU 210 executes a region identification process (labeling process) on the binary image data to identify edge regions in the binary image BI. Specifically, the CPU 210 executes a labeling process on the binary image data. For example, the CPU 210 assigns a single identifier to a pixel group that includes a plurality of edge pixels in a single contiguous cluster, such that each separate pixel group having a plurality of contiguous edge pixels is assigned a different identifier. A pixel group assigned a single identifier is identified as a single edge region. For the binary image BI used in the example of FIG. 3(B), the CPU 210 identifies eight edge regions corresponding to the eight edges Eg1-Eg8 in the binary image BI. In other words, the CPU 210 identifies eight regions corresponding to the seven objects Ob1-Ob7, and the background Bg2 in the scan image SI of FIG. 3(A). Since all of the characters are separated from each other in this example, the CPU 210 identifies a different edge region for each character.

In S30 the CPU 210 selects one edge region from among the plurality of edge regions identified in S25 to be a current region.

In S35 the CPU 210 executes a character/background color identification process on the current region. When the current region corresponds to a character, the character/background color identification process is performed to identify the color of the character (hereinafter called the "character color") and the color of the background surrounding the character (hereinafter called the "background color"). If the current region does not correspond to a character, such as when the current region corresponds to a drawing or photo, a character color and a background color is not identified for the current region. The character/background color identification process will be described later in greater detail.

In S40 the CPU 210 determines whether a character color and a background color were identified (determined) for the current region. If a character color and a background color were identified (determined) (S40: YES), the CPU 210 executes the process in S50 and S55 for improving the definition of the character. On the other hand, if a character color and a background color were not identified (determined) (S40: NO), the CPU 210 skips the process in S50 and S55.

In S50 the CPU 210 executes a character/background pixel identification process. In this process, the CPU 210 identifies pixels in the region of the scan image SI corresponding to the current region that will be subjected to a character/background pixel replacement process described later (see S55). Specifically, the CPU 210 identifies character pixels that should be (or, is estimated to be) replaced with the character color, and background pixels that should be (or, is determined to be) replaced with the background color. In other words, each character pixel is a candidate for a pixel having the character color and each background pixel is a candidate for a pixel having the background color. For example, pixels with a distorted color that is a part of a blurred image and surround a character pixel are identified as background pixels. The character/background pixel identification process will be described later in greater detail.

In S55 the CPU 210 executes the character/background pixel replacement process on the scan data. Specifically, the CPU 210 replaces values in the scan data for pixels in the scan image SI identified as character pixels in S50 with values representing the character color identified in S35 and replaces values in the scan data for pixels identified as background pixels in S50 with values representing the background color identified in S35.

In S60 the CPU 210 determines whether all edge regions have been processed as the current region. When there remain unprocessed edge regions (S60: NO), the CPU 210 returns to S30. When all edge regions have been processed (S60: YES), the CPU 210 advances to S65.

In S65, the CPU 210 performs a halftone-dot smoothing process on the resultant scan data of the character/background pixel replacement process to generate smoothed image data representing a smoothed image. Specifically, the CPU 210 applies a smoothing process to each of values of non-edge pixels in the scan data by using a smoothing filter such as a Gauss filter to calculate the smoothed values of non-edge pixels in smoothed image data. Here, each non-edge pixel in the scan data to be subjected to the smoothing process is specified by referring to the non-edge pixel of the binary image data generated in the expansion/contraction process of S20. The CPU 210 generates the smoothed image data representing a smoothed image having edge pixels and the non-edge pixels. The smoothed image data includes the values of the edge pixels in the scan data and the calculated smoothed values of the non-edge pixels.

FIG. 3(C) illustrates a smoothed image GI represented by the smoothed image data. The smoothed image GI includes a white background Bg1g, objects Ob1g to Ob7g and a background Bg2g obtained by smoothing the objects Ob1 to Ob3 and background Bg2 in the scan image SI. Portions (non-edge portions) of the objects Ob1g to Ob3g and the background Bg2g other than the edges thereof are smoother than those of the objects Ob1 to Ob3 and the background Bg2 in the scan image SI.

In S70, the CPU 210 performs an edge sharpening process to the smoothed image data to generate processed image data. Specifically, the CPU 210 applies a sharpening process such as an unsharp mask and/or a process applying a sharpening filter to each of the values of edge pixels in the smoothed image data to calculate the sharpened values of edge pixels in the processed image data. Each edge pixel to be subjected to the sharpening process is specified by referring to the edge pixel in the binary image data generated in the expansion/contraction process of S20. The CPU 210 generates processed image data representing a sharpened image having non-edge pixels and the edge pixels. The processed image data includes the smoothed values of the non-edge pixels included in the smoothed image data (the values of the non-edge pixels after the halftone-dot smoothing process) and the calculated sharpened values of the edge pixels.

FIG. 3(D) illustrates a processed image FI represented by the processed image data. The processed image FI includes a white background Bg1f and objects Ob1f to Ob7f and a background Bg2f respectively corresponding to the objects Ob1 to Ob7 and the background Bg2 in the scan image SI. The edges of the objects Ob1f to Ob7f and the background Bg2f are sharper than those of the objects Ob1 to Ob7 and background Bg2 in the scan image SI and those of the objects Ob1g to Ob7g and background Bg2g in the smoothed image GI.

In S75, the CPU 210 executes a print data generation process to generate print data using the processed image data. Specifically, the CPU 210 applies a color conversion process to the processed image data which is RGB image data to generate CMYK image data representing the color of each pixel by a CMYK value which is a color value having color components (components of C, M, Y, and K) corresponding to color materials used in printing. The color conversion process is executed by referring to, for example, a known look-up table. A halftone process is applied to the CMYK image data to generate dot data representing a dot formation state for each pixel and each color material to be used in printing. The dot formation state may include, for example, two states of "dot" and "no dot" or four states of "large dot", "medium dot", "small dot", and "no dot". The halftone process is executed according to a dither method or an error diffusion method for example. The dot data are rearranged in the order to be used in printing, and a printing command is added to the rearranged dot data to generate print data.

In S80, the CPU 210 executes the print process and ends the image process. Specifically, the CPU 210 supplies the print data to the print execution unit 280 to make the print execution unit 280 print the processed image.

By executing the character/background pixel replacement process on the scan data in S55 of the image process described above, the CPU 210 can improve the definition of borders between the character color and the background color. For example, the character/background pixel replacement process changes the color of pixels in the edge portions of characters Ob4-Ob7 adjacent to a background in the scan image SI of FIG. 3(A) to the color of these characters. This process also modifies the color of pixels in the backgrounds Bg1 and Bg2 of the scan image SI that are positioned along the edge portions of the characters Ob4-Ob7 to the colors of these backgrounds. Accordingly, this process improves the definition of borders between these character colors and the background colors in the resulting processed image FI that is printed, thereby enhancing the appearance of text in the processed image FI.

For example, pixels in the scan image SI constituting the characters Ob4-Ob7 should possess the prescribed color of the corresponding characters since the characters have a uniform color in the original. The backgrounds Bg1 and Bg2 surrounding these characters also have a uniform color in the original. However, when an image is printed based on image data generated using an image sensor (e.g., scan data), a distorted or indistinct quality (or a blurred image) may be produced in this image, particularly at the edge portions. Consequently, some pixels in the scan image SI constituting or positioned along the characters Ob4-Ob7, for example, and particularly pixels positioned at the edges of these characters may take on a different color from that in the original, such as a color that is brighter than the color of the character in the original or a color darker than the color of the background in the original. The process in the embodiment reduces this type of distortion at or along the edges of characters in the processed image FI in order to improve the definition of the borders between these character colors and the background colors.

Further, in the processed image data, smoothed values that have been subjected to the smoothing process are used for the non-edge pixels constituting a uniform portion such as the background Bg2f and a portion different from the edge of the object. As a result, halftone dots causing, e.g., moire can be suppressed from appearing in a portion different from the edge in the processed image. Accordingly, problems, such as occurrence of moire in the processed image to be printed, can be suppressed, thereby improving appearance of the processed image to be printed.

For example, the original document used in generating the scan data is a printed matter on which an image is printed. Thus, at the level of dots constituting an image, halftone dots are formed in a uniform portion such as the background Bg2 having a color different from white in the original document. An area of the halftone dots in the printed matter includes a plurality of dots and portions having no dot (portions representing the base color of the document). Therefore, at the pixel level, halftone dots are formed in an area representing the background Bg2 in the scan image SI. The halftone dots are arranged with periodicity due to influence of a dither matrix used in printing of the document. Accordingly, when printing is performed using the scan data, moire is more likely to appear due to interference between the periodic component of the halftone dot pattern existing in the original image (scan image SI) before the halftone process is performed and a periodic component of the dots constituting a printing image. In the processed image of the present example, the periodic component of the dot pattern constituting a portion different from the edge in the original image (scan image SI) is reduced by the smoothing process. As a result, when the processed image is to be printed using the processed image data, problems such as moire can be suppressed from occurring in the processed image to be printed.

The CPU 210 also executes an image process including the halftone smoothing process of S65 on the scan data to generate intermediate data (and specifically the smoothed image data) and in S70 uses this intermediate image data to generate the processed image data. As a result, this process can generate processed image data representing a processed image that has been smoothed and has suitably defined borders between the character colors and the background colors, for example.

In S70 the CPU 210 also executes an edge sharpening process on the values of edge pixels in the scan data and executes the halftone smoothing process of S65 on pixels different from these edge pixels. As a result, this process can generate the processed image data representing the processed image FI in which portions not constituting edges have been smoothed, borders between the character colors and the background colors have been suitably sharpened, and other edges (edges of the objects Ob1f-Ob3f, for example) have been enhanced.

A-3. Character/Background Color Identification Process

Figure 5:
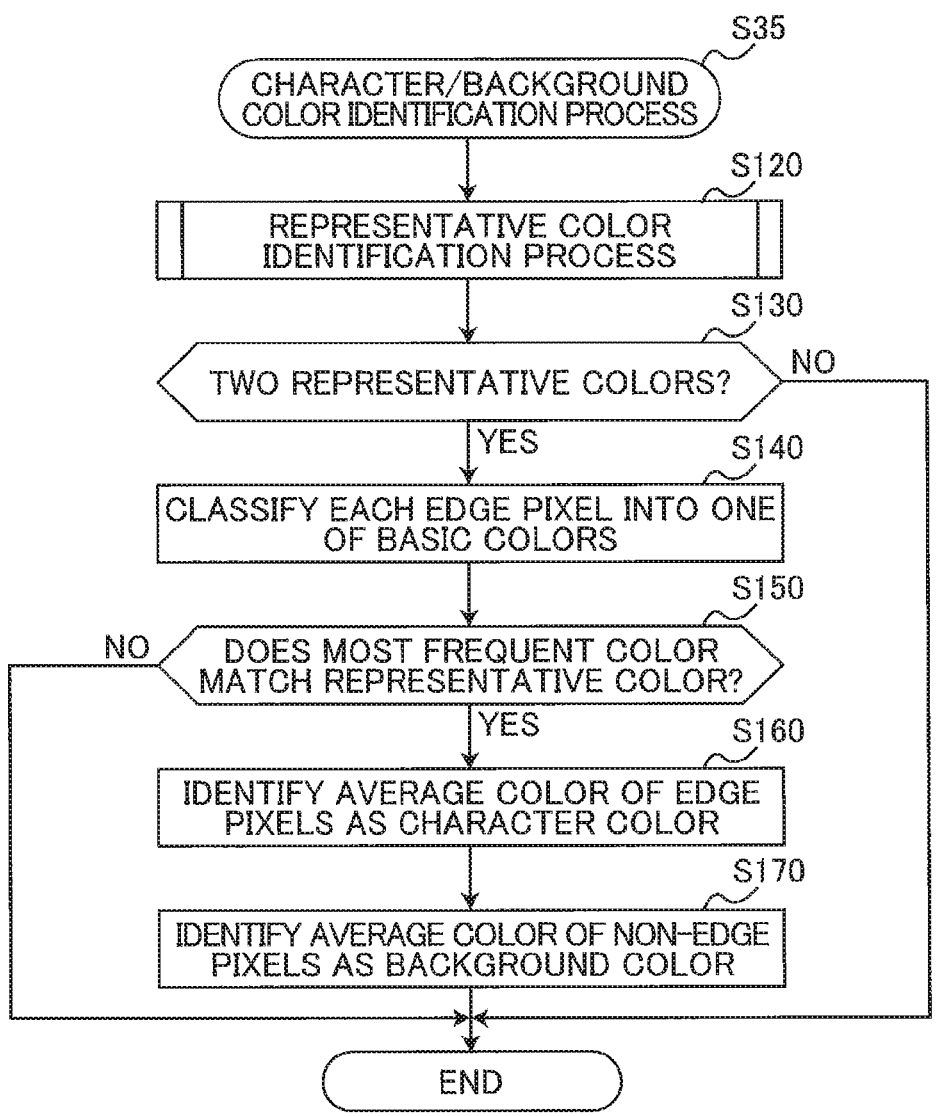
FIG. 5 is a flowchart illustrating a character/background color identification process.

Next, the character/background color identification process in S35 of FIG. 2 will be described. FIG. 5 is a flowchart illustrating steps in the character/background color identification process. In S120 of FIG. 5, the CPU 210 executes a representative color identification process. The representative color identification process is performed to identify more (or less) than two representative colors in the current region from among the eight basic colors cyan (C), magenta (M), yellow (Y), red (R), green (G), blue (B), black (K), and white (W). When the current region corresponds to a character, the CPU 210 can set the representative colors to the two basic colors corresponding to the character color and the background color.

Figure 6:
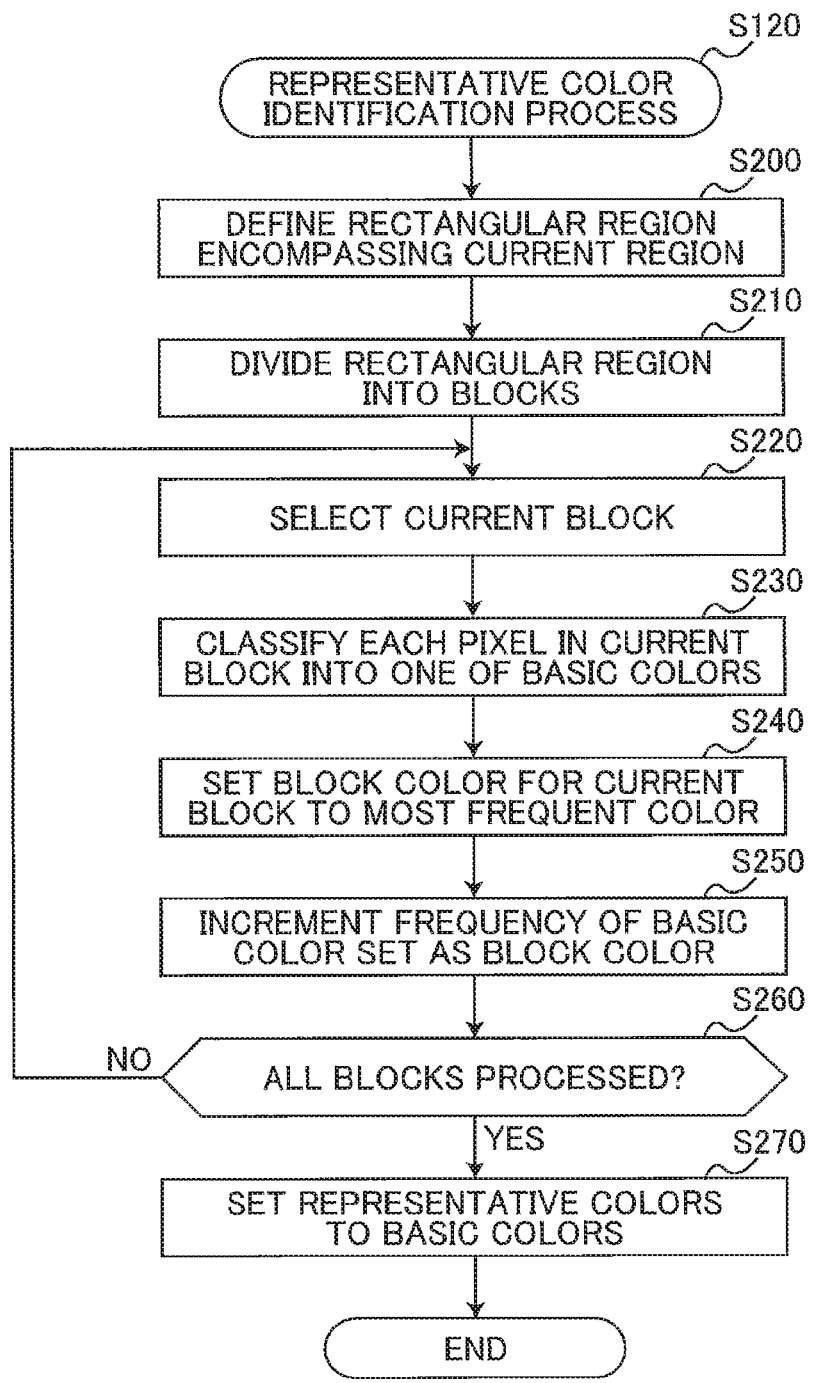
FIG. 6 is a flowchart illustrating a representative color identification process.
Figure 7A:
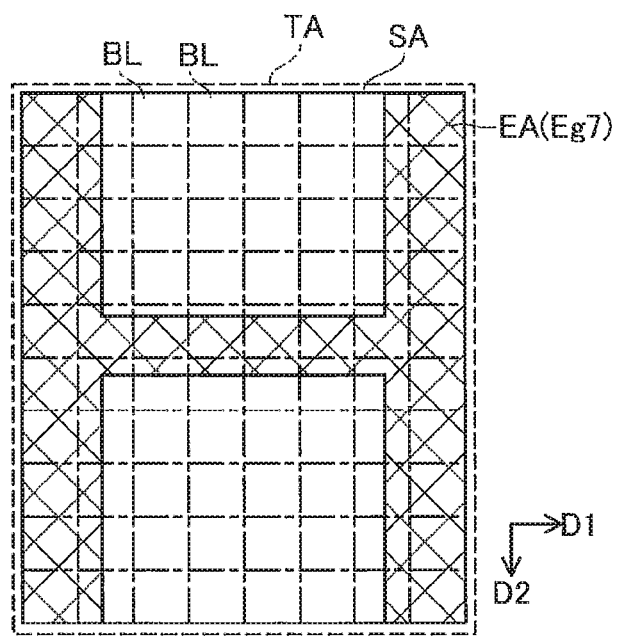
FIG. 7(A) is an explanatory diagram illustrating a rectangular region used in a representative color identification process.
Figure 7B:
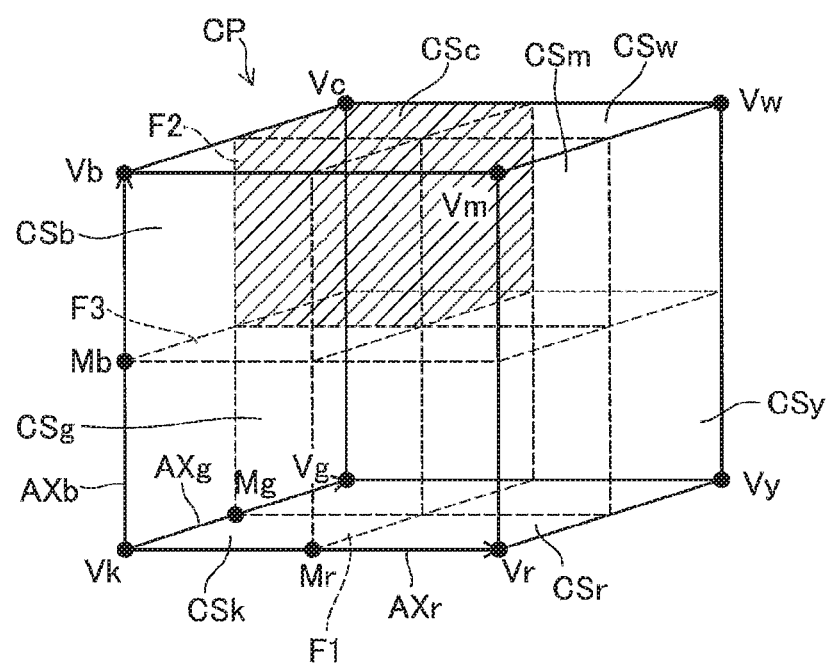
FIG. 7(B) is an explanatory diagram illustrating an RGB color space.
Figure 7C:
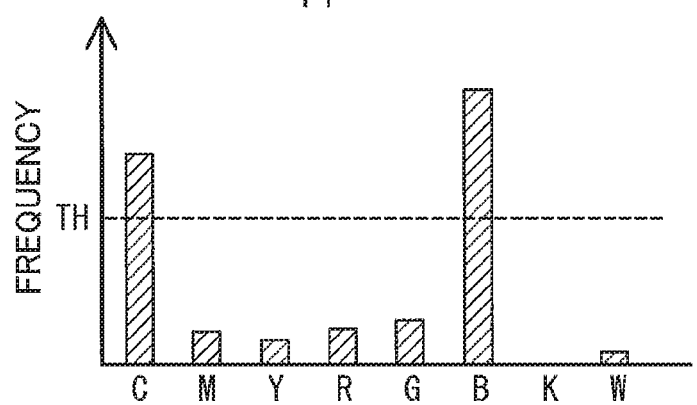
FIG. 7(C) is a histogram illustrating a frequency for each of eight basic colors.

FIG. 6 is a flowchart illustrating steps in the representative color identification process. FIG. 7(A)-7(C) provide explanatory diagrams for the representative color identification process. In S200 of FIG. 6 the CPU 210 defines a rectangular region SA that encompasses the current region. That is, the border of the rectangular region circumscribes the current region. FIG. 7(A) shows a case in which the current region is an edge region EA configured of edges pixels in the edge Eg7 (see FIG. 3(B)) corresponding to the character Ob7 in the scan image SI (see FIG. 3(A)). The shaded area in FIG. 7(A) corresponds to the edge region EA. As indicated in FIG. 7(A), the CPU 210 identifies the entire region corresponding to the character Ob7 in the scan image SI including the interior of the character Ob7 as the edge region EA (the edge pixels in the edge Eg7) after the expansion and contraction process in S20 of FIG. 2. FIG. 7(A) illustrates the rectangular region SA encompassing this edge region EA.

In S210 the CPU 210 divides the rectangular region SA encompassing the current region in the binary image BI into a plurality of blocks BL. In the example of FIG. 7(A), the rectangular region SA is divided into 80 blocks BL arranged in a matrix configuration having 8 blocks horizontally and 10 blocks vertically. A single block BL may include m×n pixels, where m is the number of pixels in a column and n is the number of pixels in a row and both m and n are integers of 2 or greater.

In S220 the CPU 210 selects one of the blocks BL set in the binary image BI to be a current block.

In S230 the CPU 210 classifies each of the pixels in the current block as one of the eight basic colors. FIG. 7(B) shows an RGB color space CP. The eight vertices of the cubic RGB color space CP correspond to the eight basic colors. That is, the eight vertices are a K point Vk (0, 0, 0), a R point Vr (255, 0, 0), a G point Vg (0, 255, 0), a B point Vb (0, 0, 255), a C point Vc (0, 255, 255), a M point Vm (255, 0, 255), a Y point Vy (255, 255, 0), and a W point Vw (255, 255, 255). The numbers in parentheses indicate the (R, G, B) color components. The RGB color space CP can be divided by three planes F1-F3 into eight cubic spaces CSc, CSm, CSy, CSr, CSg, CSb, CSk, and CSw corresponding to the eight basic colors C, M, Y, R, G, B, K, and W. The plane F1 is perpendicular to an R-axis AXr and passes through a center point Mr (128, 0, 0) of the R-axis AXr. The plane F2 is perpendicular to a G-axis AXg and passes through a center point Mg (0, 128, 0) of the G-axis AXg. The plane F3 is perpendicular to a B-axis AXb and passes through a center point Mb (0, 0, 128) of the B-axis AXb. The spaces CSc, CSm, CSy, CSr, CSg, CSb, CSk, and CSw respectively includes points Vc, Vm, Vy, Vr, Bg, Vb, Vk, and Vw. For example, the shaded space CSc of FIG. 7(B) corresponds to cyan (C). When sorting pixels in the current block in S230, the CPU 210 classifies each pixel to one of the basic colors C, M, Y, R, G, B, K, and W corresponding to the space in which the pixel is included. For example, the CPU 210 classifies, into the basic color cyan C, pixels whose corresponding RGB values in the scan image SI fall in the space CSc that corresponds to cyan C.

In S240 the CPU 210 sets the block color for the current block to the most frequent color in the current block. The most frequent color in the current block is the basic color into which the largest number of pixels were classified in S230. In S250 the CPU 210 increments the frequency of the basic color set as the block color in S240 for the current block by 1.

In S260 the CPU 210 determines whether all blocks BL in the rectangular region SA encompassing the current region have been processed as the current block. When there remain unprocessed blocks BL (S260: NO), the CPU 210 returns to S220. When all blocks BL have been processed (S260: YES), the CPU 210 advances to S270.

In S270 the CPU 210 sets the representative color(s) for the current region to one or more basic colors having a frequency greater than or equal to a threshold TH. FIG. 7(C) is an example of a histogram showing a frequency for each of the eight basic colors. In FIG. 7(C), cyan (C) and blue (B) are the only two colors among the eight basic colors C, M, Y, R, G, B, K, and W each having a frequency greater than or equal to the threshold TH. Hence, based on the example of FIG. 7(C), the CPU 210 sets the representative colors for the current region to C and B. The number of representative colors that the CPU 210 sets is not limited to two colors, but may be a single color or three or more colors. The threshold TH is set to approximately 20% of the total number of blocks BL constituting the scan image SI that encompasses the current region, for example.

After completing the representative color identification process, in S130 of FIG. 5, the CPU 210 determines whether the number of representative colors set for the current region is two colors. Normally, there is a high probability that a single character in an original will be rendered by one color, and the background of that character by another color. Accordingly, when the current region corresponds to a character, the number of representative colors will be two colors corresponding to the character color and the background color. When the current region corresponds to an object other than a character (a photo, for example), the object may include many more colors than a character. Consequently, the number of representative colors for such an object may be a different number from two.

If the number of representative colors for the current region is not two (S130: NO), the current region need not be subjected to the process in S50 and S55 of FIG. 2 since there is a high probability that the current region corresponds to a non-character object. Thus, the CPU 210 ends the character/background color identification process in this case without setting a character color and background color.

If the current region has two representative colors (S130: YES), in S140 the CPU 210 classifies each of the edge pixels in the current region into one of the eight basic colors. Here, the method described in S230 of FIG. 6 may be used for classifying the edge pixels.

In S150 the CPU 210 determines whether the most frequent color of the edge pixels matches one of the two representative colors set in S120. The most frequent color of the edge pixels is the basic color into which the largest number of the edge pixels were classified among the edge pixels in the current region in S140. Since most of the edge pixels will correspond to pixels constituting a character in the scan image SI when the current region corresponds to a character, the most frequent color in the edge pixels corresponds to the character color. As described above, when the current region corresponds to a character, the two representative colors correspond to the character color and the background color. Accordingly, when the current region corresponds to a character, the most frequent color of the edge pixels will match one of the two representative colors. When the current region corresponds to an object other than a character, the most frequent color of the edge pixels may not match either representative color.

When the most frequent color of the edge pixels does not match either of the two representative colors (S150: NO), the current region need not be subjected to the process in S50 and S55 of FIG. 2 since the current region likely corresponds to an object other than a character. Hence, in this case the CPU 210 ends the character/background color identification process without setting the character color and the background color.

However, when the most frequent color of the edge pixels matches one of the two representative colors (S150: YES), in S160 the CPU 210 identifies the average color of the plurality of edge pixels as the character color. Specifically, the CPU 210 calculates RGB values (Rav1, Gav1, Bav1) configured of an average value Rav1 of R values for the edge pixels, an average value Gav1 of G values for the edge pixels, and an average value Bav1 of B values for the edge pixels and sets these RGB values as the RGB values representing the character color. Thus, the CPU 210 identifies the character color using the values of all edge pixels of the character identified in the rectangular region SA, thereby identifying the character color with great accuracy. As a variation, the CPU 210 may identify the most frequent color of the edge pixels to be the character color. In this case, the character color is identified as one of the C, M, Y, R, G, B, K, and W basic colors.

In S170 the CPU 210 identifies as the background color the average color of the plurality of pixels excluding the edge pixels (i.e., the non-edge pixels) in the rectangular region SA encompassing the current region. Specifically, the CPU 210 calculates RGB values (Rav2, Gav2, Bav2) configured of an average value Rav2 of R values for the non-edge pixels, an average value Gav2 of G values for the non-edge pixels, and an average value Bav2 of B values for the non-edge pixels and sets these RGB values as the RGB values representing the background color. Thus, the CPU 210 identifies the background color using the values of a plurality of non-edge pixels not constituting the character identified in the rectangular region SA, thereby identifying the background color with great accuracy. As a variation, the CPU 210 may identify the background color to be one of the two representative colors described above that differs from the most frequent color of the edge pixels. In this case, one of the eight basic colors different from the character color is identified to be the background color. After identifying the character color and background color, the CPU 210 ends the character/background color identification process.

According to the character/background color identification process described above, the scan data is used to identify the color corresponding to a specific character (the character Ob7 in FIG. 3, for example) in the target image data as the character color and to identify the color corresponding to the background surrounding the specific character as the background color. Hence, the character pixels and the background pixels can be replaced with their corresponding suitable colors in the character/background pixel replacement process in S55 of FIG. 2. Accordingly, the borders of characters can be made better defined in the processed image.

Also in the character/background color identification process, the rectangular region SA corresponding to a specific character in the scan image SI (the character Ob7, for example) is divided into a plurality of blocks BL (S210 of FIG. 6). The plurality of pixels in each block BL is used to set a block color corresponding to that block BL (S230 and S240 of FIG. 6). Subsequently, the character color and the background color are identified based on blocks having the same block colors that total a number greater than or equal to the threshold TH (S270 of FIG. 6, S140-S170 of FIG. 5). Thus, the character color and the background color can be properly identified from a plurality of block colors.

The values of the edge pixels in the rectangular region SA are used to determine whether the color of the object (character or photo, for example) in the rectangular region SA corresponds to ("matches" in the embodiment) one of the two representative colors (S150 of FIG. 5). The character color is identified when the color of the object corresponds to one of the two representative colors and is not identified when the color of the object does not correspond to either of the two representative colors (S150 and S160 of FIG. 5). Similarly, the background color is identified when the color of the object corresponds to one of the two representative colors and is not identified when the color of the object does not correspond to one of the two representative colors (S150 and S170 of FIG. 5). Hence, the character color can be identified when the object is a character and is not identified when the object is not a character. Therefore, the character color and the background color for a character can be made well defined when the object is a character, and a process designed for improving the definition of characters (the process in S50 and S55 of FIG. 2, for example) is prevented from accidentally being executed on objects that are not characters.

A-4. Character/Background Pixel Identification Process

Figure 8:
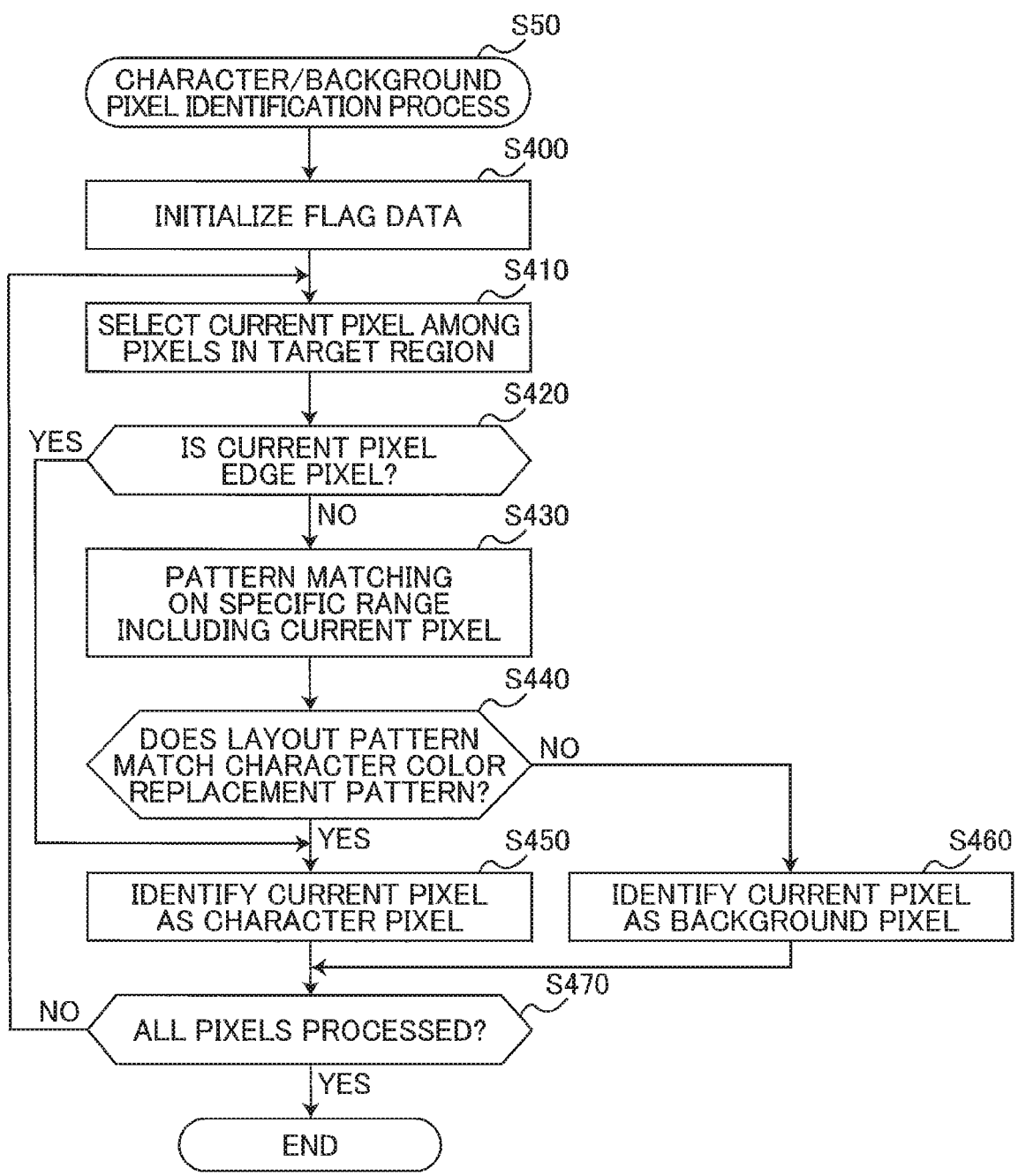
FIG. 8 is a flowchart illustrating a character/background pixel identification process.

Next, the character/background pixel identification process in S50 of FIG. 2 will be described. FIG. 8 is a flowchart illustrating steps in this character/background pixel identification process. In S400 of FIG. 8, the CPU 210 initializes flag data. The flag data specifies values for a plurality of flags corresponding to respective ones of a plurality of pixels in a target region TA (described below). When the flag data is initialized, each flag is set to an initial value ("0" in the embodiment) that indicates neither a character pixel nor a background pixel.

In S410 the CPU 210 selects one pixel from among pixels in the target region TA to be a current pixel. In the embodiment, the target region TA is a region formed by enlarging the rectangular region SA encompassing the current region by a prescribed amount (see FIG. 7(A)). Specifically, the target region TA is a rectangular area formed by expanding the rectangular region SA outward one pixel on the top, bottom, left, and right sides. The target region TA is formed larger than the rectangular region SA so that the pixels to be processed include pixels adjacent to the outside of edge pixels positioned on the edge within the rectangular region SA.

In S420 the CPU 210 determines whether the current pixel is an edge pixel. If the current pixel is an edge pixel (S420: YES), in S450 the CPU 210 identifies the current pixel to be a character pixel. That is, the CPU 210 updates the value of the flag in the flag data corresponding to the current pixel to a value specifying a character pixel ("1" in the embodiment).

If the current pixel is not an edge pixel (S420: NO), i.e., when the current pixel is a non-edge pixel, the CPU 210 executes the process in S430-S460 to identify the current pixel as either a character pixel or a background pixel.

Figure 9:
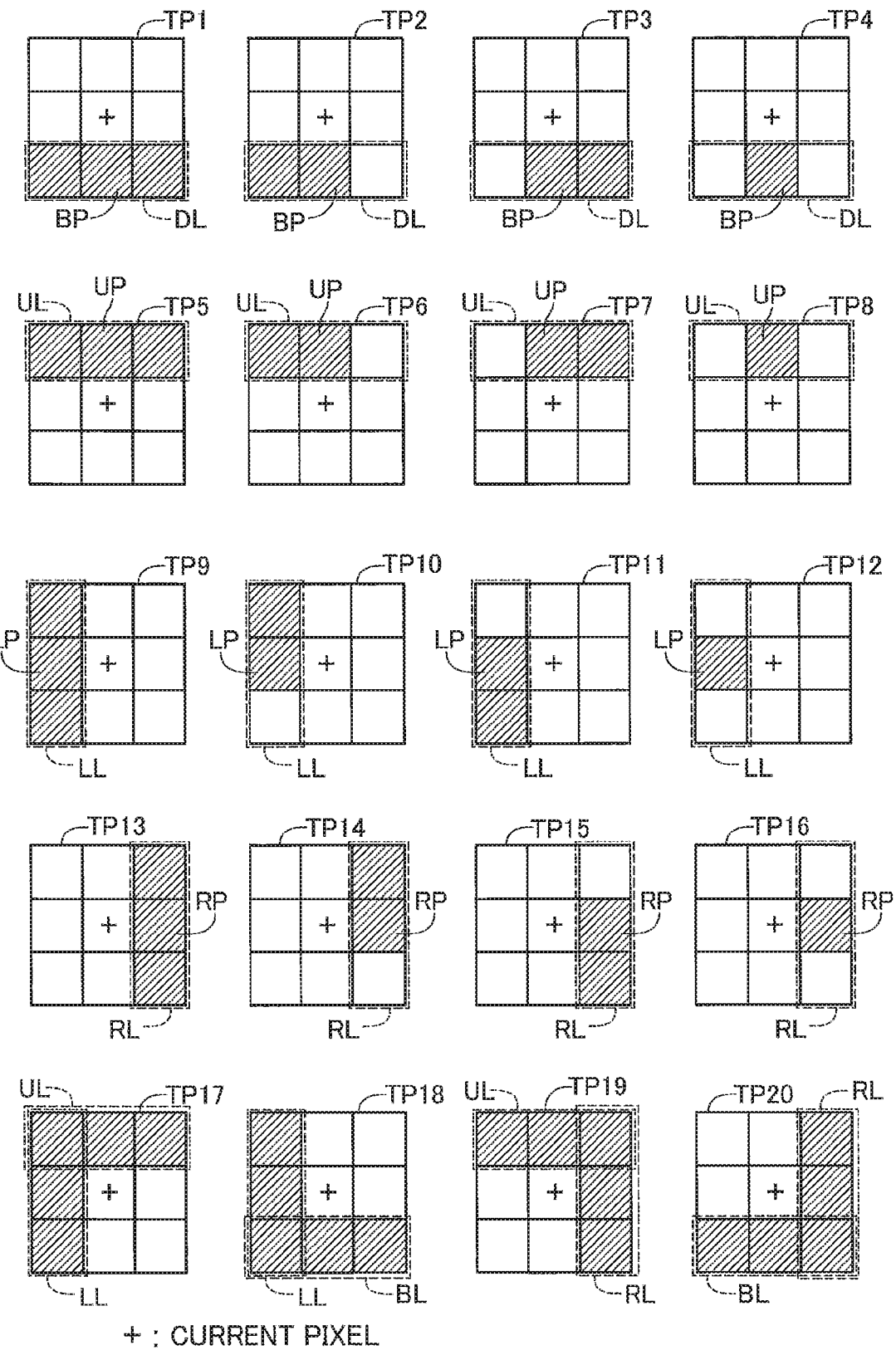
FIG. 9 is an explanatory diagram illustrating character replacement patterns.

In S430 the CPU 210 performs pattern matching on a specific range of pixels that includes the current pixel. FIG. 9 is an explanatory diagram showing a plurality of character color replacement patterns. As shown in FIG. 9, the specific range is a block of pixels that includes 3 pixels vertically and 3 pixels horizontally and that is centered on the current pixel. In the patterns shown in FIG. 9, shaded squares denote edge pixels, while non-shaded squares denote non-edge pixels. The center square that includes the "+" denotes the current pixel, which is a non-edge pixel. Through pattern matching, the CPU 210 determines whether the layout pattern of edge pixels and non-edge pixels in the specific range matches one of the 20 character color replacement patterns TP1-TP20 in FIG. 9.

In the character color replacement patterns TP1-TP4, the row positioned below the current pixel is a row DL whose center pixel positioned directly beneath the current pixel is a pixel BP. In these patterns, at least the pixel BP in the row DL is an edge pixel, and all pixels not in the row DL are non-edge pixels.

In the character color replacement patterns TP5-TP8, the row positioned above the current pixel is a row UL whose center pixel positioned directly above the current pixel is a pixel UP. In these patterns, at least the pixel UP in the row UL is an edge pixel, and all pixels not in the row UL are non-edge pixels.

In the character color replacement patterns TP9-TP12, the column positioned to the left of the current pixel is a column LL whose center pixel positioned directly left of the current pixel is a pixel LP. In these patterns, at least the pixel LP in the column LL is an edge pixel, and all pixels not in the column LL are non-edge pixels.

In the character color replacement patterns TP13-TP16, the column positioned to the right of the current pixel is a column RL whose center pixel positioned directly right of the current pixel is a pixel RP. In these patterns, at least the pixel RP in the column RL is an edge pixel, and all pixels not in the column RL are non-edge pixels.

In the character color replacement patterns TP17-TP20, all pixels in one of the rows UL and BL positioned above and below the current pixel and all pixels positioned in one of the columns LL and RL positioned left and right of the current pixel are edge pixels, while the remaining four pixels are non-edge pixels.

In S440 the CPU 210 determines whether the layout pattern of edge pixels and non-edge pixels in the specific range matches one of the character color replacement patterns TP1-TP20. When the layout pattern in the specific range matches one of the character color replacement patterns TP1-TP20 (S440: YES), in S450 the CPU 210 identifies the current pixel to be a character pixel. That is, the CPU 210 updates the value of the flag in the flag data that corresponds to the current pixel to the value specifying a character pixel ("1" in the embodiment).

However, if the layout pattern in the specific range does not match any of the character color replacement patterns TP1-TP20 (S440: NO), i.e., if the layout pattern in the specific range matches a background color replacement pattern different from the character color replacement patterns TP1-TP20, in S460 the CPU 210 identifies the current pixel to be a background pixel. That is, the CPU 210 updates the value of the flag in the flag data that corresponds to the current pixel to the value specifying a background pixel ("2" in the embodiment).

FIG. 10 shows examples of background color replacement patterns BP1-BP8. The background color replacement patterns are patterns having a size of the specific range (3 pixels vertically and 3 pixels horizontally), indicating a center pixel corresponding to the current pixel (non-edge pixel), and each of remaining 8 pixels indicating either one of an edge pixel of a non-edge pixel. While only some of the background color replacement patterns are shown in FIG. 10, the background color replacement patterns include all patterns (specifically, all patterns of 8 pixels surrounding the center pixel corresponding to the current pixel (non-edge pixel)) that differ from the twenty character color replacement patterns TP1-TP20 in FIG. 9. Shaded squares in FIG. 10 denote edge pixels. Squares with a "*" denote either a non-edge pixel or an edge pixel. Squares with a "+" denote the current pixel, which is a non-edge pixel.

In all of the background color replacement patterns BP1-BP8 in FIG. 10, the current pixel is sandwiched between two edge pixels, either in the vertical or left-right direction. Specifically, in the background color replacement patterns BP1-BP4, at least both the pixel UP positioned above the current pixel and the pixel BP positioned below the current pixel are edge pixels. In the background color replacement patterns BP5-BP8, at least both the pixel RP positioned to the right of the current pixel and the pixel LP positioned to the left of the current pixel are edge pixels.

As described above, both the character color replacement patterns and the background color replacement patterns are the same size of the specific range, are a center pixel corresponds to the current pixel (non-edge pixel) and peripheral pixels (8 pixels in this example) surrounding the center pixel. Here, the peripheral pixels are a combination (or pattern) of the edge pixels and the non-edge pixels. The combinations (or patterns) of the peripheral pixels in the background color replacement patterns include all the combinations (or patterns) of the peripheral pixels excluding all the combinations (or patterns) of the peripheral pixels in the character color replacement patterns. So, in S440, the CPU 210 determines whether the layout pattern of edge pixels and non-edge pixels in the specific rage matches one of the background color replacement patterns by determining whether the layout pattern matches one of the character color replacement patterns. However, the CPU 210 may directly compare the layout pattern of edge pixels and non-edge pixels in the specific rage matches one of the background color replacement patterns and determine whether the layout pattern matches one of the background color replacement patterns.

In S470 the CPU 210 determines whether all pixels in the target region TA have been processed as the current pixel. When there remain unprocessed pixels (S470: NO), the CPU 210 returns to S410 and selects an unprocessed pixel to be the current pixel. When all pixels have been processed (S470: YES), the CPU 210 ends the character/background-pixel identification process.

According to S10 of FIG. 2 in the embodiment described above, the CPU 210 acquires the scan data generated by the scan execution unit 290 as the target image data. In S15-S25 the CPU 210 identifies the edge pixels based on the values of pixels in the scan image SI. Subsequently, in the character/background color identification process in S35 of FIG. 2 (see FIG. 8), the CPU 210 identifies these edge pixels as character pixels that should possess the character color (first pixels that should possess the first color; S420 and S450 of FIG. 8). When non-edge pixels (peripheral pixels) positioned around the edge pixels (character pixels) are set as the current pixel (S410 of FIG. 8), the CPU 210 determines whether the pixel satisfies a specific condition (S420-S440 of FIG. 8).

The specific condition in the embodiment requires that the layout pattern in a specific range not match any of the character color replacement patterns TP1-TP20 (that the pattern matches one of the background color replacement patterns). Pixels among the plurality of non-edge pixels that satisfy the specific condition are identified as background pixels that should possess (or, that is estimated to possess) the background color (second pixels that should possess (or, is estimated to possess) the second color; S460 of FIG. 8). In the replacement process in S55 of FIG. 2, the CPU 210 replaces the values for character pixels with values representing the character color and replaces the values for background pixels with values representing the background color, as a replacement process of a specific image process. Accordingly, the processed image FI will include a plurality of pixels having the character color that correspond to the plurality of character pixels identified in the scan image SI and a plurality of pixels having the background color that correspond to the plurality of background pixels identified in the scan image SI. Thus, the borders between the character color and the background color can be sharpened in the scan image SI (see FIG. 3(D)). With this method, the CPU 210 can properly identify background pixels since the specific condition requires that a plurality of pixels within a specific range that includes the current pixel match a background color replacement pattern formed of edge pixels and non-edge pixels (see FIG. 10). As a result, the CPU 210 can produce processed image data representing a processed image FI in which borders between the character color and the background color in the scan image SI are suitably enhanced.

Figure 11:
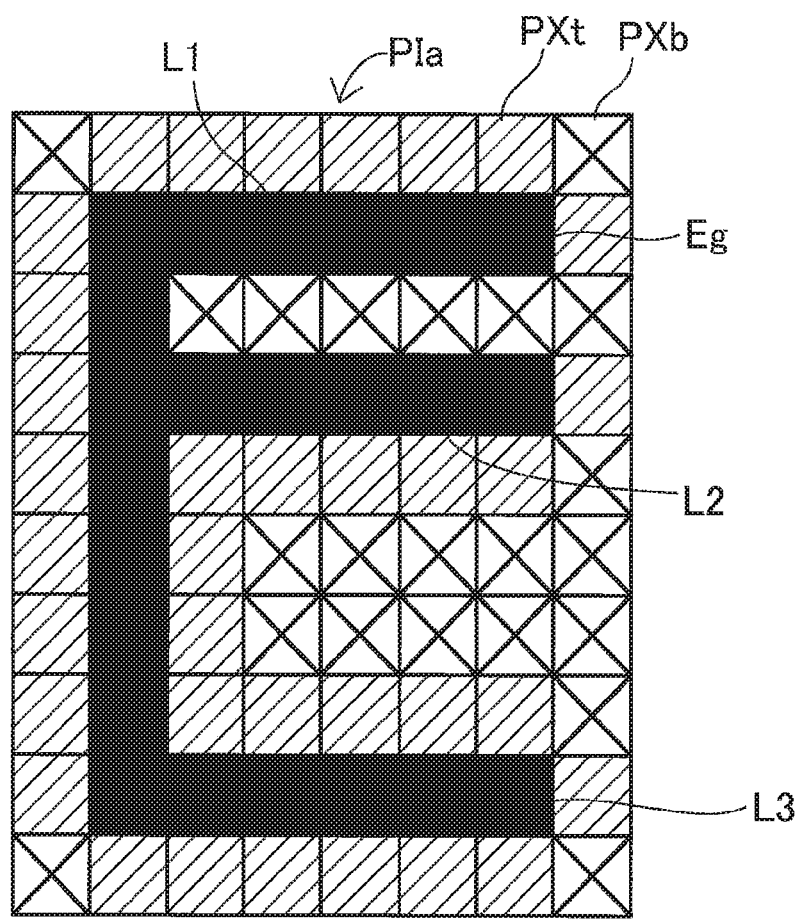
FIG. 11 is an example of a partial image of the scan image.

Here, a specific example of the above process will be described. FIG. 11 shows an example of a partial image PIa in the scan image SI. The squares in the partial image PIa represent pixels. Black pixels denote edge pixels Eg. Among the non-edge pixels, shaded pixels denote pixels PXt that have been identified as character pixels, while pixels with a "X" denote pixels PXb that have been identified as background pixels. In the processed image FI, the values for edge pixels Eg have been replaced with values representing the character color. Non-edge pixels positioned between character lines L1 and L2 configured by edge pixels are identified as background pixels in FIG. 11 because each non-edge pixel positioned between lines L1 and L2 satisfies the specific condition, that is, a non-edge pixel between the lines L1 and L2 and 8 pixels surrounding the non-edge pixel match one of the background color replacement patterns BP1-BP4 in FIG. 10.

Non-edge pixels positioned between the lines L1 and L2 are easily corrupted during the scanning process, and may take on a color different from the character color and the background color in the scan image SI, such as an intermediate color between the character color and the background color. Consequently, the resulting character in the scan image SI may appear indistinct, with no clear separation between the lines L1 and L2 of the character, resulting in poor appearance and legibility of the character. In the processed image FI according to the embodiment, the values of pixels PXb among the non-edge pixels identified as background pixels are replaced with values representing the background color (S55 of FIG. 2). As a result, the resulting character in the processed image FI is more legible and has an improved appearance since the lines L1 and L2 of the character are clearly separated and the character is sharper.

In the embodiment described above, the background color replacement patterns have two edge pixels adjacent to both sides of the current pixel with respect to a prescribed direction (either the vertical or left-right direction; see FIG. 11). Thus, the embodiment avoids the problem of two lines L1 and L2 constituting a character from becoming merged together in the processed image FI.

In the embodiment, edge pixels that do not satisfy the specific condition (i.e., pixels that match one of the character color replacement patterns TP1-TP20) are identified as character pixels (S450 of FIG. 8). Accordingly, the embodiment can more clearly define the borders between the character color and the background color in the processed image FI. As shown in the example of FIG. 11, pixels below the line L2 and pixels above and below a line L3 constituting the character are identified as character pixels. Since the pixels beneath the line L2 of the character and the pixels above and below the line L3 can easily become distorted during the scanning process, the pixels may take on a color in the scan image SI that differs from the character color and the background color, such as an intermediate color between the character color and the background color. However, in the processed image FI according to the embodiment the values of pixels PXt among the non-edge pixels identified as character pixels are replaced with values representing the character color (S55 of FIG. 2). Thus, the embodiment can improve the appearance and legibility of the character by making the lines L2 and L3 of the character thick and distinct in the processed image FI.

In the embodiment, edge pixels identified in the binary image data are set to character pixels in the character/background pixel identification process (S450 of FIG. 8). Thus, the embodiment can enhance the character color without changing the color of non-edge parts, such as parts in the scan image SI having a uniform color except the background pixels. This technique can prevent a drop in image quality from occurring as a result of modifying the colors of non-edge portions except the background pixels in the scan image SI.

After the expansion and contraction process is executed in S20 of FIG. 2, edge pixels identified in the binary data produced from this process are set as character pixels. In this way, pixels in a region between edge pixels are identified as the character pixel, thereby more suitably defining borders between the character color and the background color. As described with reference to FIG. 4, pixels that should be identified as character pixels (or, pixels that is estimated to originally indicate character pixels) may not be identified due to the presence of notches CR, gaps NT, and the like in the identified edge. However, such problems can be avoided by executing the expansion and contraction process, thereby producing better-defined borders between the character color and the background color.

B. Variations of the Embodiment (1) In the character/background pixel identification process according to the embodiment (FIG. 8), when a non-edge pixel and 8 pixels surrounding the non-edge pixel including a non-edge pixel as a center pixel match one of the background color replacement patterns, the center non-edge pixel is identified as a background pixel, whereas when a non-edge pixel and 8 pixels surrounding the non-edge pixel match one of the character color replacement patterns TP1-TP20, the center non-edge pixel is identified as a character pixel. That is, non-edge pixels in the target region TA are identified as either character pixels or background pixels. As an alternative, when a non-edge pixel and 8 pixels surrounding the non-edge pixel match one of the background color replacement patterns, the center non-edge pixel may be identified as background pixels whereas when a non-edge pixel and 8 pixels surrounding the non-edge pixel match none of the background color replacement patterns, the center non-edge pixel may be identified as neither a background pixel nor a character pixel. In this case, pixels not identified as either background pixels or character pixels maintain the same color in the processed image FI that they possessed in the scan image SI.

(2) The character color replacement patterns in FIG. 9 and the background color replacement patterns in FIG. 10 are merely examples of the embodiment, but patterns are not limited to these. The character color replacement patterns may correspond to ranges of various sizes that include the current pixel, such as a range of 5 pixels vertically by 5 pixels horizontally, or 7 pixels vertically by 7 pixels horizontally. Further, the character color replacement patterns and the background color replacement patterns may be any of various patterns formed of edge pixels and non-edge pixels, depending on the type of character being targeted (kanji (Chinese characters), alphanumeric characters, etc.). For example, the background color replacement patterns may include patterns having a non-edge pixel area sandwiched between the two edge pixels. Here, all the pixels in the non-edge pixel area are non-edge pixels and one of the pixels in the non-edge pixel area correspond to the current pixel. That is, pixels in the non-edge pixel area constitutes a contiguous cluster of the non-edge pixels, and two edge pixels are adjacent both sides of the contiguous cluster of the non-edge pixels in a prescribed direction.

(3) In the embodiment, through the processes (S420: YES and S440), edge pixels identified from binary image data generated in S10-S20 are set to character pixels. However, pixels identified by another technique may be set as character pixels. For example, the CPU 210 may identify character regions in the scan image SI through a well-known object recognition process and may perform thresholding on pixels in each character region to classify each of these pixels to a pixel having a color close to the background color (white, for example) and an object pixel having a color different from the background color. The CPU 210 may set the object pixels identified through this thresholding to character pixels. In this case, for each pixel classified into the pixel having the color close to the background color, the processes S430 and S440 may be performed.

(4) In S35 of FIG. 2 in the embodiment, the CPU 210 executes the character/background color identification process to identify a character color and a background color. However, the character color and the background color may be predetermined colors. For example, when the target image data is monochrome scan data, the character color may be set to black and the background color to white.

(5) In the embodiment, the value of each of the pixels constituting the scan data is represented by the RGB value, but may be represented by a color value of another color system. For example, the value of each of the pixels constituting the scan data may be represented by a color value of a CMY color system including three component values of C, M, and Y.

(6) In the embodiment, the edge sharpening process is applied to the edge pixels (S70 of FIG. 2), and the halftone-dot smoothing process is applied to the non-edge pixels (S65 of FIG. 2). Alternatively, an anti-alias process for improving appearance of a character may be applied to the edge pixels. Further, a process for washing out color (process for converting the pixel color into white) may be applied to the non-edge pixels for the purpose of reducing the amount of color materials in printing. Generally, it is preferable to perform an image process performed on the edge pixel is different from an image process performed on the non-edge pixels. Alternatively, a specific image process may be applied to one of a group of the edge pixels and a group of the non-edge pixels, and not be applied to remaining one of the group of the edge pixels and the group of the non-edge pixels.

(7) In the embodiment, the scan data is used as the target image data. Alternatively, the target image data may be generated by a digital camera provided with a two-dimensional image sensor reading a printed matter.

(8) In the embodiment, the processed image based on the processed image data is subject for printing (S75 and S80 of FIG. 2). Alternatively, the processed image may be subject for displaying on a display portion such as a liquid crystal display.

(9) The image processing apparatus performing the image process of FIG. 2 is not limited to the multifunction peripheral 200, but may be various devices. For example, a scanner or a digital camera may execute the image process of FIG. 2 on target image data generated by itself so as to generate print data to be supplied to a printer. Further, for example, a terminal device (for example, the terminal device 100) or a server (not illustrated) that can communicate with a scanner and a printer may execute the image process of FIG. 2 on scan data acquired from the scanner to generate print data to be supplied to the printer. Further, a plurality of computers (for example, cloud servers) communicable with one another through a network may execute the image process as a whole while sharing the function required for the image process among them. In this case, the plurality of computers is an example of the image processing apparatus.

(10) In the embodiment described above, some of the configurations implemented through hardware may be replaced by software, and conversely some of the configurations implemented through software may be replaced by hardware. For example, the character/background pixel replacement process of S55 in FIG. 2 and the edge sharpening process of S70 of FIG. 2 may be executed by dedicated hardware such as an ASIC.

While the description has been made in detail with reference to the specific embodiment, the embodiment described above is an example for making the present disclosure easier to understand and does not limit the present disclosure. It would be apparent to those skilled in the art that various changes and modifications may be made thereto.

What is claimed is:

1. An image processing apparatus comprising a processor configured to perform:
   acquiring target image data generated by using an image sensor, the target image data representing a target image including a plurality of pixels, the target image data having a plurality of pixel values corresponding to respective ones of the plurality of pixels;
   identifying, as a first type pixel, a pixel among the plurality of pixels by using the plurality of pixel values, the first type pixel being one of candidates for a pixel to have a first color;
   setting a target pixel from among peripheral pixels of the pixel which is identified as the first type pixel in the target image;
   determining whether the target pixel satisfies a specific condition;
   identifying the target pixel as a second type pixel in a case where the target pixel satisfies the specific condition, the second type pixel being a candidate for a pixel to have a second color different from the first color; and
   generating processed image data by performing a replacement process in which a pixel value of the pixel identified as the first type pixel is replaced with a first value representing the first color and a pixel value of the pixel identified as the second type pixel is replaced with a second value representing the second color,
   wherein the specific condition includes a condition that all specific pixels, which are located in a specific range and include the target pixel, match a specific pattern of the first type pixel and a pixel different from the first type pixel.

2. The image processing apparatus according to claim 1, wherein the specific pattern includes a corresponding pixel corresponding to the target pixel, and two first type pixels adjacent both sides of the corresponding pixel in a prescribed direction.

3. The image processing apparatus according to claim 1, wherein the processor is configured to further perform identifying the target pixel as a third type pixel in a case where the target pixel does not satisfy the specific condition, a pixel value of the third type pixel being replaced with the first value in the replacement process.

4. The image processing apparatus according to claim 1, wherein the processor is configured to further perform:
   identifying as the first color a color of a specific character included in the target image; and
   identifying as the second color a color of a background of the specific character.

5. The image processing apparatus according to claim 1, wherein the processor is configured to further perform specifying a plurality of edge pixels which indicates one or more edges in the target image,
   wherein each of the plurality of edge pixels is identified as the first type pixel.

6. The image processing apparatus according to claim 5, wherein the processor is configured to further perform:
   an expansion process expanding the specified one or more edges; and
   a contraction process contracting the expansion processed one or more edges,
   wherein the target pixel is set after the expansion process and the contraction process are performed.

7. The image processing apparatus according to claim 1, wherein the processor is configured to further perform a smoothing process on at least part of the plurality of pixel values to smooth the target image to generate intermediate data,
   wherein the processed image data is generated using the intermediate data.

8. The image processing apparatus according to claim 7, wherein the processor is configured to further perform:
   specifying a plurality of edge pixels which indicates one or more edges in the target image; and
   a sharpening process on a pixel value of each of the plurality of edge pixels to sharpen the specified one or more edges,
   wherein the smoothing process is performed on pixel values of pixels different from the plurality of edge pixels.

9. The image processing apparatus according to claim 1, wherein the processor is configured to further perform generating print data using the processed image data.

10. The image processing apparatus according to claim 1, wherein the specific pattern includes at least two contiguous second type pixels, and two first type pixels adjacent both sides of the at least two contiguous second type pixels in a prescribed direction, the at least two contiguous second type pixels being arranged in the prescribed direction, one of the at least two contiguous second type pixels corresponding to the target pixel.

11. A non-transitory computer readable storage medium storing a set of program instructions for an image processing apparatus, the set of program instructions comprising:

acquiring target image data generated by using an image sensor, the target image data representing a target image including a plurality of pixels, the target image data having a plurality of pixel values corresponding to respective ones of the plurality of pixels;

identifying, as a first type pixel, a pixel among the plurality of pixels by using the plurality of pixel values, the first type pixel being one of candidates for a pixel to have a first color;

setting a target pixel from among peripheral pixels of the pixel which is identified as the first type pixel in the target image;

determining whether the target pixel satisfies a specific condition;

identifying the target pixel as a second type pixel in a case where the target pixel satisfies the specific condition, the second type pixel being a candidate for a pixel to have a second color different from the first color; and generating processed image data by performing a replacement process in which a pixel value of the pixel identified as the first type pixel is replaced with a first value representing the first color and a pixel value of the pixel identified as the second type pixel is replaced with a second value representing the second color, wherein the specific condition includes a condition that all specific pixels, which are located in a specific range and include the target pixel, match a specific pattern of the first type pixel and a pixel different from the first type pixel.

12. A method comprising:

acquiring target image data generated by using an image sensor, the target image data representing a target image including a plurality of pixels, the target image data having a plurality of pixel values corresponding to respective ones of the plurality of pixels;

identifying, as a first type pixel, a pixel among the plurality of pixels by using the plurality of pixel values, the first type pixel being one of candidates for a pixel to have a first color;

setting a target pixel from among peripheral pixels of the pixel which is identified as the first type pixel in the target image;

determining whether the target pixel satisfies a specific condition;

identifying the target pixel as a second type pixel in a case where the target pixel satisfies the specific condition, the second type pixel being a candidate for a pixel to have a second color different from the first color; and generating processed image data by performing a replacement process in which a pixel value of the pixel identified as the first type pixel is replaced with a first value representing the first color and a pixel value of the pixel identified as the second type pixel is replaced with a second value representing the second color, wherein the specific condition includes a condition that all specific pixels, which are located in a specific range and include the target pixel, match a specific pattern of the first type pixel and a pixel different from the first type pixel.

* * * * *